(12) United States Patent
Dougherty (10) Patent No.: US 11,460,531 B2
(45) Date of Patent: Oct. 4, 2022

(54) SYSTEMS AND METHODS FOR ENHANCED DIRECTION OF ARRIVAL DETECTION AND CALCULATION

(71) Applicant: The Boeing Company, Chicago, IL (US)

(72) Inventor: William Warfield Dougherty, Bellevue, WA (US)

(73) Assignee: The Boeing Company, Chicago, IL (US)

(*) Notice: Subject to any disclaimer, the term of this patent is extended or adjusted under 35 U.S.C. 154(b) by 199 days.

(21) Appl. No.: 16/803,096

(22) Filed: Feb. 27, 2020

(65) Prior Publication Data
US 2021/0270925 A1    Sep. 2, 2021

(51) Int. Cl.
| | |
|---|---|
| *G01S 5/02* | (2010.01) |
| *G01S 3/10* | (2006.01) |
| *G01S 3/48* | (2006.01) |
| *G01S 3/46* | (2006.01) |
| *G01S 3/02* | (2006.01) |

(52) U.S. Cl.
CPC ............ *G01S 3/10* (2013.01); *G01S 3/48* (2013.01); *G01S 3/02* (2013.01); *G01S 3/46* (2013.01)

(58) Field of Classification Search
CPC ..... G01S 3/02; G01S 3/10; G01S 3/48; G01S 3/46
USPC ....................... 342/417, 420, 445
See application file for complete search history.

(56) References Cited

U.S. PATENT DOCUMENTS

| | | | | |
|---|---|---|---|---|
| 4,975,710 A | * | 12/1990 | Baghdady | ............... G01S 3/46 342/433 |
| 5,296,861 A | | 3/1994 | Knight | |
| 6,366,241 B2 | * | 4/2002 | Pack | ............... G01S 3/48 342/442 |
| 7,847,733 B2 | * | 12/2010 | Shirakawa | ............... G01S 3/74 342/417 |
| 8,072,311 B2 | | 12/2011 | Sadr et al. | |
| 9,489,813 B1 | | 11/2016 | Beigel | |
| 9,857,451 B2 | | 1/2018 | Kim et al. | |
| 9,912,074 B2 | * | 3/2018 | Ray | ............... H01Q 21/08 |
| 9,958,527 B2 | * | 5/2018 | Tuxen | ............... G01S 13/4454 |
| 10,317,518 B2 | | 6/2019 | Warnick et al. | |
| 10,539,645 B2 | * | 1/2020 | Bialer | ............... G01S 3/50 |
| 10,935,624 B2 | * | 3/2021 | Zarubica | ............... G01S 3/48 |

(Continued)

FOREIGN PATENT DOCUMENTS

JP        H06281715 A * 10/1994 ............... G01S 3/14

*Primary Examiner* — Chuong P Nguyen
(74) *Attorney, Agent, or Firm* — Armstrong Teasdale LLP (57) ABSTRACT

A system for determining a direction of arrival for signals is provided. The system includes a non-uniform linear array including a plurality of antenna and configured to receive a wireless signal. The system is programmed to receive a plurality of normalized phase candidates for the direction of arrival of the received wireless signal. For each of the plurality of normalized phase candidates, the at least one processor is programmed to calculate a phase error, estimate a plurality of unwrapped measured phases based on the corresponding phase error, and calculate a likelihood based on the corresponding plurality of unwrapped measured phases. The at least one processor is further programmed to select a normalized phase candidate as a direction of arrival estimate based on a comparison of the plurality of likelihood normalized phases.

20 Claims, 6 Drawing Sheets

(56) References Cited

U.S. PATENT DOCUMENTS

| | | | |
|---|---|---|---|
| 11,171,710 B2* | 11/2021 | Kim | H04B 7/088 |
| 2003/0210670 A1* | 11/2003 | Kisigami | H04L 1/06 |
| | | | 370/335 |
| 2016/0334498 A1 | 11/2016 | Jamieson et al. | |
| 2017/0059685 A1* | 3/2017 | Moghaddasi | G01S 3/48 |
| 2018/0356507 A1 | 12/2018 | Ichinose et al. | |
| 2019/0182627 A1 | 6/2019 | Thoresen et al. | |
| 2019/0293743 A1* | 9/2019 | Reisenfeld | G01S 3/043 |
| 2022/0113363 A1* | 4/2022 | Reisenfeld | G01S 3/72 |

* cited by examiner

SYSTEMS AND METHODS FOR ENHANCED DIRECTION OF ARRIVAL DETECTION AND CALCULATION

BACKGROUND

The field of the present disclosure relates generally to calculating the detection of arrival of signals and, more specifically, to automatically and rapidly detecting and calculating the direction of arrival for radio and radar signals using a non-uniform linear array.

Many systems may receive multiple brief bursts of signals from multiple sources on a wide range of frequencies. In real-world situations, it may be important to identify and locate the sources of these signals. Furthermore, it may be necessary to calculate the direction of arrival for multiple signals received simultaneously. Many known methods to calculate the direction of arrival are calculation intensive, require too long to calculate to be effective (e.g. greater than one millisecond (ms)), and/or provide inaccurate or inconsistent results. For many applications, the speed and accuracy of calculating the direction of arrival are vitally important. Accordingly, it would be useful to have a system that provides speed and accuracy in direction of arrival calculations without requiring significant additional hardware.

BRIEF DESCRIPTION

In one aspect, a system for determining a direction of arrival for signals is provided. The system includes a non-uniform linear array including a plurality of antenna. The non-uniform linear array is configured to receive a wireless signal. The system also includes a computing device including at least one processor in communication with at least one memory device. The at least one processor is programmed to receive a plurality of normalized phase candidates for the direction of arrival of the received wireless signal. For each of the plurality of normalized phase candidates, the at least one processor is also programmed to calculate a phase error. For each of the plurality of normalized phase candidates, the at least one processor is further programmed to estimate a plurality of unwrapped measured phases based on the corresponding phase error. In addition, for each of the plurality of normalized phase candidates, the at least one processor is programmed to calculate a likelihood based on the corresponding plurality of unwrapped measured phases. Moreover, the at least one processor is programmed to select a normalized phase candidate as a direction of arrival estimate based on a comparison of the plurality of likelihood normalized phases.

In another embodiment, a computing device for determining a direction of arrival for signals is provided. The computing device includes at least one processor in communication with at least one memory device. The at least one processor is programmed to receive a plurality of normalized phase candidates for the direction of arrival of a received wireless signal. The received wireless signal is received by a non-uniform linear array including a plurality of antenna. For each of the plurality of normalized phase candidates, the at least one processor is also programmed to calculate a phase error. For each of the plurality of normalized phase candidates, the at least one processor is further programmed to estimate a plurality of unwrapped measured phases based on the corresponding phase error. For each of the plurality of normalized phase candidates, the at least one processor is programmed to calculate a likelihood based on the corresponding plurality of unwrapped measured phases. Moreover, the at least one processor is programmed to select a normalized phase candidate as a direction of arrival estimate based on a comparison of the plurality of likelihood normalized phases.

In another embodiment, a method for determining a direction of arrival for signals is provided. The method is implemented on a computing device including at least one processor in communication with at least one memory device. The method includes receiving a plurality of normalized phase candidates for the direction of arrival of a received wireless signal. The received wireless signal is received by a non-uniform linear array including a plurality of antenna. For each of the plurality of normalized phase candidates, the method also includes calculating a phase error, estimating a plurality of unwrapped measured phases based on the corresponding phase error, and calculating a likelihood based on the corresponding plurality of unwrapped measured phases. The method further includes selecting a normalized phase candidate as a direction of arrival estimate based on a comparison of the plurality of likelihood normalized phases.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements, which are presently discussed, it being understood, however, that the present embodiments are not limited to the precise arrangements and instrumentalities shown, wherein.

DETAILED DESCRIPTION

The implementations described herein relate to systems and methods for calculating the detection of arrival of signals and, more specifically, to automatically and rapidly detecting and calculating the direction of arrival for radio and radar signals using a non-uniform linear array. More specifically, a direction of arrival ("DOA") computer device is provided for calculating potential directions of arrival of multiple simultaneous signals.

In the exemplary embodiment, a non-uniform linear array of antenna receives a signal from a source, where the source is a mile or more distant from the non-uniform linear array. The signal arrives at each antenna at slightly different times, which causes the phase of the signal received at different antenna in the array to be different and to arrive at different times. The DOA computer device uses those phase and time differences to determine a direction of arrival of the signal, which leads to the direction of the signal source relative to the non-uniform linear array.

Described herein are computer systems such as the DOA computer devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application-specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer-readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

Figure 1:
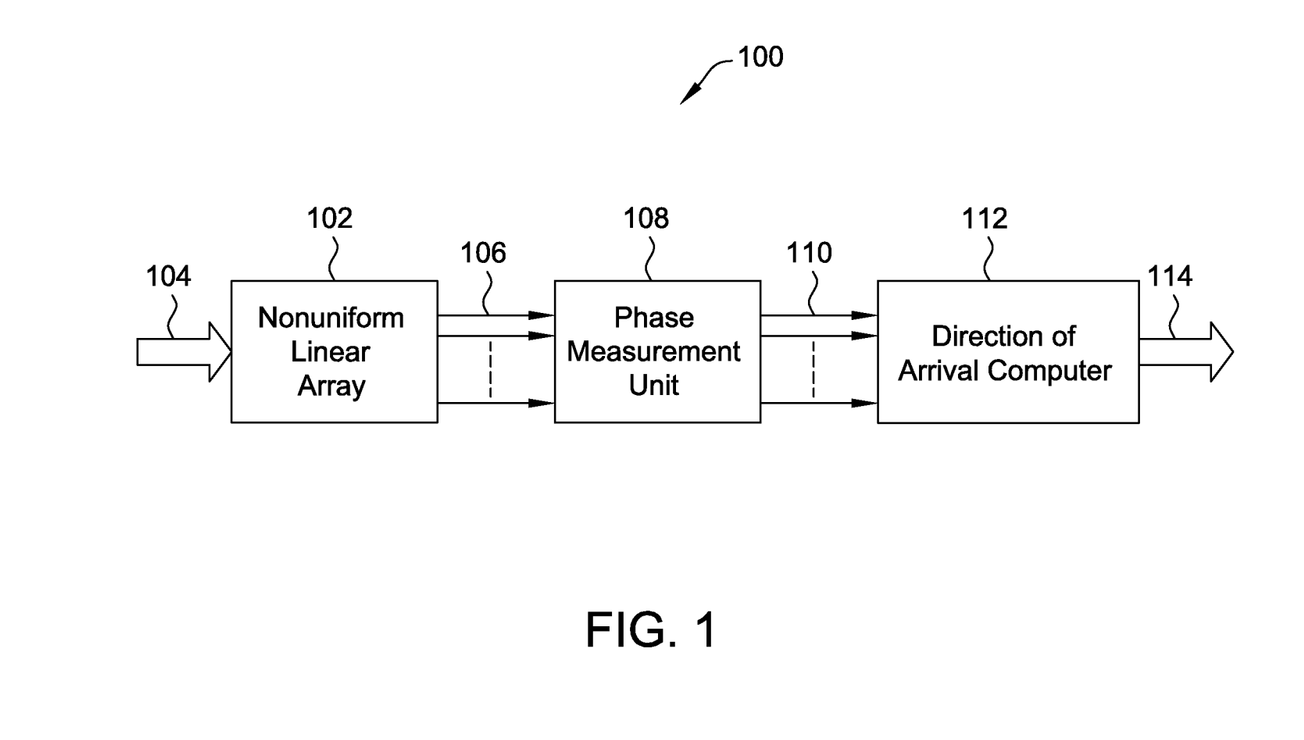
FIG. 1 illustrates a block diagram of a system to calculate the direction of arrival for received signals using a non-uniform linear array, in accordance with one embodiment of the present disclosure.

FIG. 1 illustrates a block diagram of a system 100 to calculate the direction of arrival for received signals using a non-uniform linear array 102, in accordance with one embodiment of the present disclosure.

In the exemplary embodiment, a non-uniform linear array 102 receives wireless electronic signals 104. In the exemplary embodiment, the non-uniform linear array 102 includes three to six antenna elements 1 to M (shown in FIG. 2), which are each positioned at a different distance from each other. In some embodiments, the wireless signals 104 include brief bursts lasting from 100 nanoseconds (ns) to 100 milliseconds (ms). In some embodiments, the wireless signals 104 include far field narrow band electromagnetic plane waves. In some further embodiments, the wireless signals 104 include radar and/or radio signals. In some embodiments, the signals 104 are low power signals. In the exemplary embodiment, the non-uniform linear array 102 receives multiple signals 104 from multiple sources simultaneously. In the exemplary embodiment, the non-uniform linear array 102 may receive signals 104 from sources that may be up to 1 to 1000 miles from the non-uniform linear array 102.

The non-uniform linear array 102 transmits the received signals 104 to a phase measurement unit 108 as unaltered electrical signals 106. In some embodiments, the non-uniform linear array 102 is connected to the phase measurement unit 108 via a wired connection, such as a coaxial cable. The phase measurement unit 108 calculates the relative phases between pairs of signals from the antennas of the non-uniform linear array 102.

The phase measurement unit 108 transmits the relative phases 110 to a direction of arrival computer device 112. The direction of arrival computer device 112 rapidly estimates the direction of arrival for the received signals 104 based on the detected phase differences as described herein. The direction of arrival computer device 112 transmits the direction of arrival estimate $\hat{\eta}$ 114 with the maximum likelihood to a user computer device 702 (shown in FIG. 7) or other computing device.

For example, in a system 100 with M antennas within the non-uniform linear array 102, the phase measurement unit 108 calculates M−1 antenna pair phase measurements, so that each of the M antennas is included in at least one of the measurements. For example, if M is equal to five, then antenna pair phase measurements may include Antenna 1 and Antenna 4, Antenna 1 and Antenna 3, Antenna 2 and Antenna 4, and Antenna 2 and Antenna 5.

Figure 2:
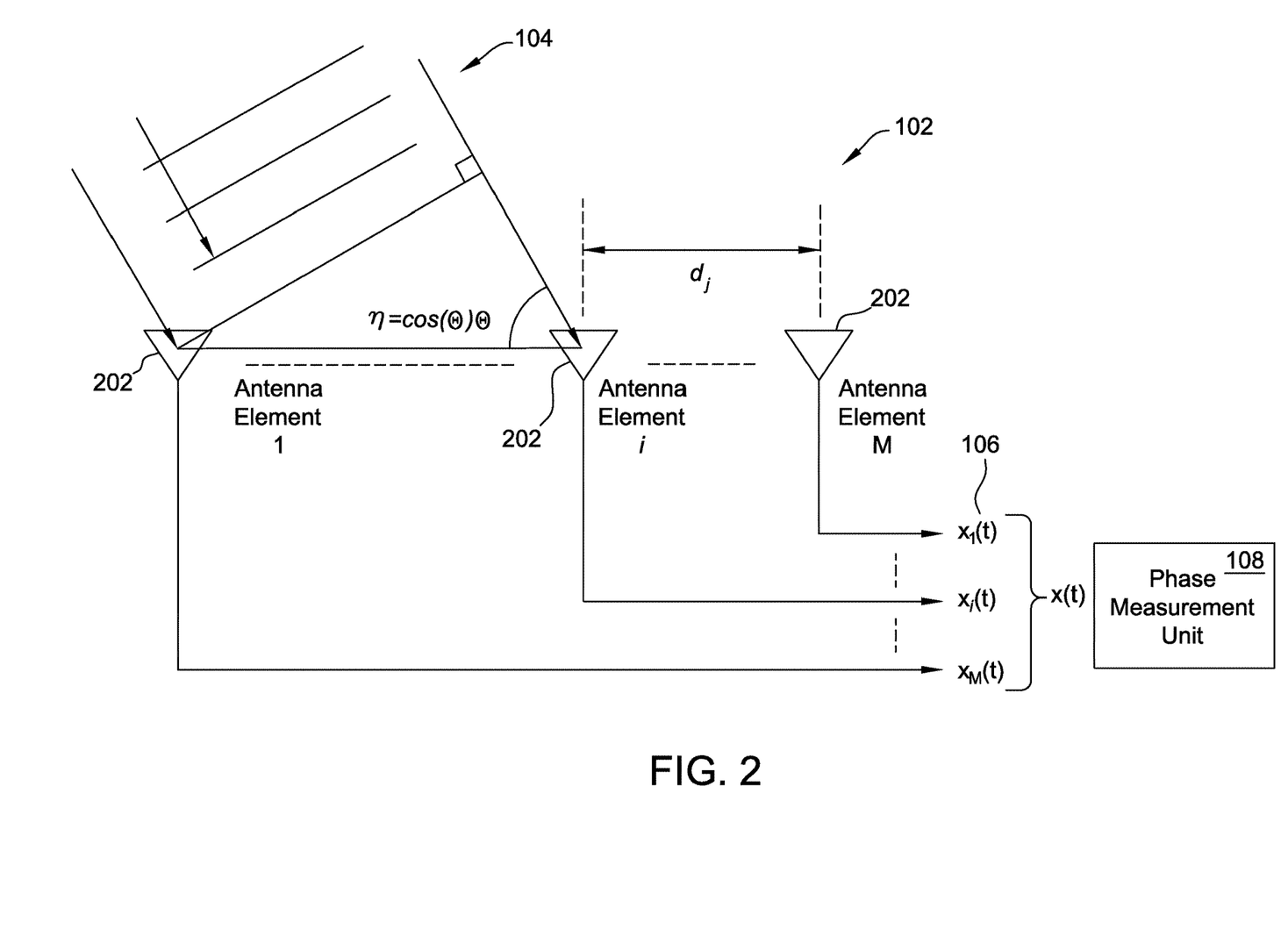
FIG. 2 illustrates the non-uniform linear array used in the system shown in FIG. 1.

FIG. 2 illustrates the non-uniform linear array 102 used in the system 100 (shown in FIG. 1).

The non-uniform linear array 102 includes M antenna elements 202. In the exemplary embodiment, the non-uniform linear array 102 includes three to six antennas 202 arranged in a straight line. In other embodiments, other numbers of antennas are possible. In the exemplary embodiment, the antennas 202 are positioned such that the first antenna and the last antenna are within 10 feet of each other. In other embodiments, other lengths of the non-uniform linear array 102 are possible. The antenna elements 202 are spaced in a non-uniform and possibly irregular manner, such that every distance between pairs of antenna elements 202 is different from each other. In the exemplary embodiment, each antenna 202 is spaced differently from the other antenna 202 in the array 102 to improve the accuracy of the calculations based on where in the waveform each of the antennas 202 receives the signal 104, as each difference in distance allows for another data point. In the exemplary embodiment, each antenna 202 is a wideband antenna, such as, but not limited to a spiral antenna. For an example where M is equal to five, the pairs of antennas 202 are selected from the 5 antennas, such that antennas 1 and 3 make up a pair and antennas 1 and 2 make up a pair for the purpose of determining the distance between them. The phase measurement unit 108 (shown in FIG. 1) calculates the relative phases between pairs of signals from pairs of the antennas 202 of the non-uniform linear array 102. As such, the phase measurement unit 108 determines the phase difference between the signal 104 received at antenna 1 and the signal received at antenna 4.

In the exemplary embodiment, arriving plane waves 104 from a far field source create an angle θ between the plane waves 104 and the array 102. The normalized phase η is the cosine of this angle. As shown herein, the direction of arrival computer device 112 (shown in FIG. 1) calculates the value η, which is then used to calculate the angle of arrival θ for a source.

The antenna elements 202 transmit the received plane waves 104 to the phase measurement unit 108 as signals $x_i(t)$.

Figure 3:
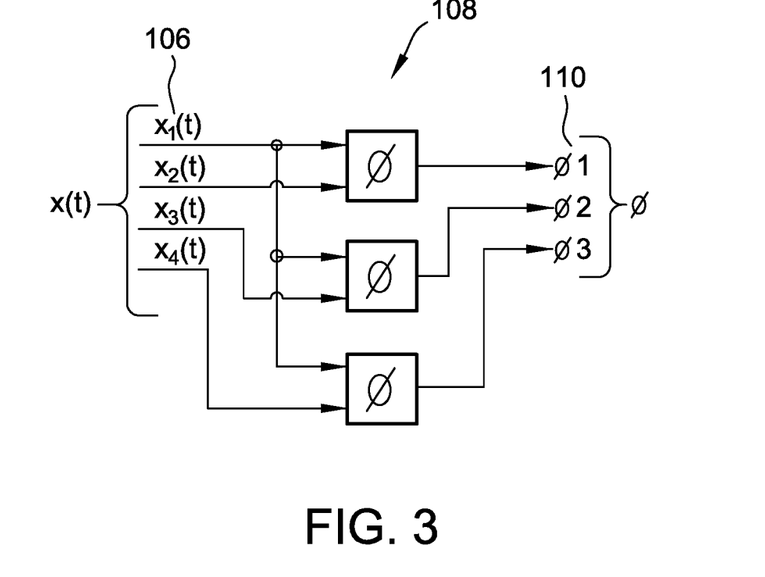
FIG. 3 illustrates a phase measurement unit used in the system shown in FIG. 1.

FIG. 3 illustrates the phase measurement unit 108.

Plane waves 104 from a far-field source arrive with a slight delay between antennas 202 (shown in FIG. 2). These time delays result in a phase shift between the electrical signals x(t) 106 output from the non-uniform linear array 102 (shown in FIG. 2). The phase measurement unit 108 measures these phase shifts 110 (also known as phase differences 110), reporting them to the direction of arrival computer device 112 (shown in FIG. 1). One phase difference 110 is reported per measured pair of antenna 202.

FIG. 3 depicts an example of the phase measurement unit 108. In this example, M=4 antenna elements 202 are organized into N=3 pairs. One phase per pair is measured and the ensemble is reported to the direction of arrival computer device 112 as the N×1 vector ϕ.

The true (error-free) unwrapped phase difference ($y_t$) between the signal copies received on the antenna pairs may be calculated as:

$$y_t = \frac{1}{\lambda}\eta_t d \qquad \text{EQ. 1}$$

where $\eta_t$ is the true normalized phase and d is the vector of antenna spacing. For example, $d_3$ is the third element of the vector d and represents the distance between the antennas 202 used to calculate the third reported phase difference $\phi_3$. In the exemplary embodiment, the phase measurement unit 108 may only measure phases modulo-2π, such that:

$$\phi_t = \text{mod}(y_t, 2\pi) \qquad \text{EQ. 2}$$

Figure 4:
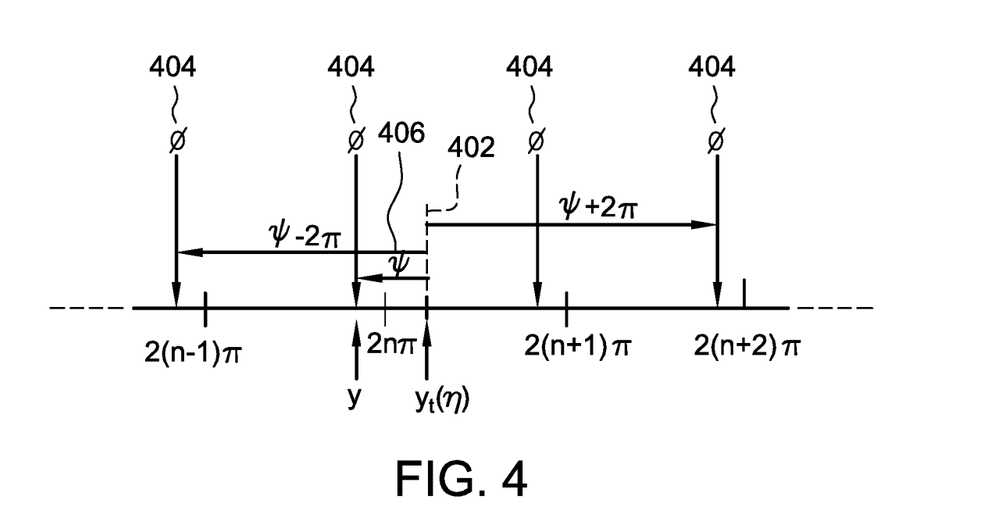
FIG. 4 is a graph displaying several calculated potential directions of arrival in accordance with one embodiment of the present disclosure.

Because of the wide bandwidth over which the system 100 (shown in FIG. 1) works, a single measured phase $\phi_i$ can be produced by several possible directions of arrival, as shown in FIG. 4. The direction of arrival computer device 112 accommodates this ambiguity.

FIG. 4 is a graph displaying several calculated potential directions of arrival in accordance with one embodiment of the present disclosure.

In the absence of errors, the true phase 402 would be $y_t(\eta)$ as shown in FIG. 4. Because of noise in the system 100 (shown in FIG. 1), and because in a typical embodiment the distance between antenna elements 202 exceeds the wavelength of the received signal 104, the phase measurement unit 108 (shown in FIG. 1) will measure y modulo 360 degrees, which is different from the true phase 402. When the direction of arrival computer device 112 assembles a list of candidates 404 for the normalized phase, the list is based on adding and subtracting 360 degrees one or more times from the y provided by the phase measurement unit 108. The different candidates 404 (phases ϕ) shown in FIG. 4 are limited to the four candidates 404 shown based on the difference in distance between the two antennas being used for this measurement and the frequency of the received signal 104 (shown in FIG. 1). However, these four candidates 404 (phases ϕ) are still different from the true phase 402 ($y_t(\eta)$) by an amount of error 406 (ψ), between what should have been measured and what was actually measured due to noise in the system 100.

For example, since the phase measurement unit 108 may only measure phase at modulo 360, if the phase difference 110 is 400 degrees, then the phase measurement unit 108 outputs that phase difference 110 as 40 degrees. As used herein, "rolled" or "wrapped means the phase is in modulo 360 degrees while "unwrapped" means the real phase, which could be more than 360 degrees.

Figure 5:
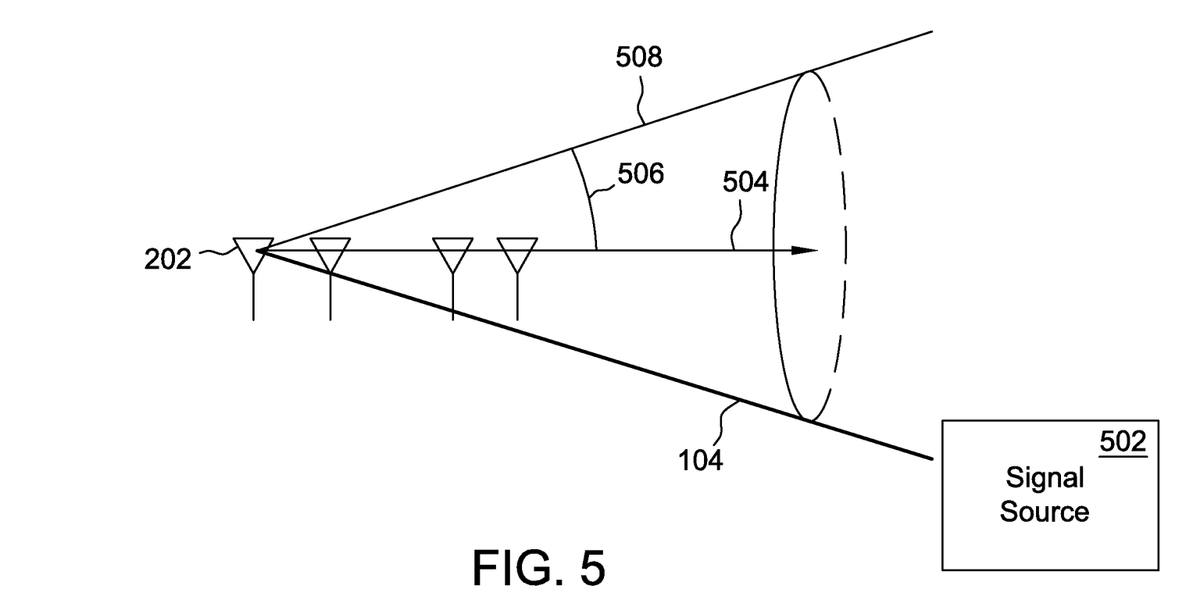
FIG. 5 illustrates a block diagram of a cone angle used for determining potential source locations, in accordance with one embodiment of the present disclosure.

FIG. 5 illustrates a block diagram of a cone angle used for determining potential source locations 502, in accordance with one embodiment of the present disclosure. FIG. 5 illustrates a plurality of antenna 202 in a non-uniform linear array 102 (as shown in FIG. 1). The plurality of antenna 202 receive a wireless signal 104 from a signal source 502. The plurality of antenna 202 aligns with an array vector 504, which is the line that goes through the antenna 202. For the received wireless signal 104, the direction of arrival computer device 112 (shown in FIG. 1) determines the angle 506 between the received signal 104 and the array vector 504. Based on the determined angle 506, the direction of arrival computer device 112 generates the cone 508 of possible locations of the source 502 of the signal 104.

In the exemplary embodiment, the plurality of antenna 202 in the non-uniform linear array 102 receives the wireless signal 104 at different points in time. The signals 106 (shown in FIG. 1) from the different antenna 202 are transmitted to the phase measurement unit 108 (shown in FIG. 1). The phase measurement unit 108 generates a plurality of phase differences 110 based on the difference in phase between the signal 104 received at a first antenna 202 and the same signal 104 received at a second antenna 202. The direction of arrival computer device 112 receives the phase differences 110 from the phase measurement unit 108 and assembles a list of candidates 404 (shown in FIG. 4) for the normalized phase. The list is based on adding and subtracting 360 degrees one or more times from the y provided by the phase measurement unit 108.

The direction of arrival computer device 112 selects a candidate set of normalized phases 404 (also known as direction of arrival estimates). In the exemplary embodiment, the direction of arrival estimate 404 is the angle 506 between the direction of arrival and the array vector 504. In the exemplary embodiment, the phase measurement unit 108 provides the phase difference measurements 110 within the range [−360,360]. Accordingly, if the phase difference is 400 degrees, the phase measurement unit 108 provides the difference 110 as 40 degree. The direction of arrival computer device 112 compares the frequency that the signals 104 arrived on and the distance between the individual antennas in the non-uniform linear array 102 to know the amount of phase difference that there should be between pairs of antennas 202. The direction of arrival computer device 112 selects the candidate set of normalized phases 404 as those that are possible based on the provided phase difference 110. Using the 40-degree example, the direction of arrival computer device 112 may select 40, 400, 760, −320, and −680 as the candidate set of normalized phases.

$$\{\eta_k\} = \frac{\lambda}{d_{max}}(\phi_{max} + 2\pi k) \quad \text{EQ. 3}$$

where $\eta$ is the normalized phase and $\eta_k$ is the kth candidate normalized phase, is the signal wavelength, $d_{max}$ is the longest antenna pair spacing, $\phi_{max}$ is the phase measured on the longest antenna pair spacing. For the equations described herein, non-bold characters are scalar values, bold lower case letters are vectors, and bold capital letters are matrices. Furthermore, $\hat{a}$ would be considered an estimate for a since there is noise in the system 100 that makes it difficult to know exactly what $a_t$ would be.

From this, the direction of arrival computer device 112 calculates rolled phase errors given each candidate normalized phase. As used herein, "rolled" or "wrapped" means the phase is in modulo 360 degrees while "unwrapped" means the real phase, which could be more than 360 degrees.

$$\psi_k = \mathrm{mod}\left(\phi - \frac{1}{\lambda}\eta_k d + \pi, 2\pi\right) - \pi \quad \text{EQ. 4}$$

where $\psi_k$ is the vector of measured phases rolled to within $\pi$ of expected, assuming that $\eta_k$ is the true normalized phase, $\phi$ is the vector of measured phases, d is the vector of antenna's spacings, and mod(a,b) is the remainder of integer division of a by b.

For each candidate normalized phase, the direction of arrival computer device 112 estimates the unwrapped measured phase:

$$\hat{y}_k = \frac{1}{\lambda}\eta_k d + \psi_k \quad \text{EQ. 5}$$

where $\hat{y}_k$ is the estimate of unwrapped measured phases, assuming that $\eta_k$ is the true normalized phase.

The direction of arrival computer device 112 improves each candidate normalized phase, assuming that the true normalized phase is close to the candidate normalized phase.

$$\hat{\eta}_k = \arg \max_\eta f_{\hat{y}_k}(\hat{y}_k \mid \eta) = \lambda \frac{\hat{y}_k^T R d}{d^T R d} \quad \text{EQ. 6}$$

where $\hat{\eta}_k$ is the maximum likelihood estimate of the normalized phase, assuming it is near the kth candidate normalized phase $\eta_k$, R is the phase noise covariance matrix, where a superscript T indicates the transpose of a vector, and where $f_A(a|b)$ is a probability density function of a random variable A, subject to condition B, and evaluated at value a.

The direction of arrival computer device 112 selects the most likely normalized phase from the set of improved candidates. In the exemplary embodiment, the direction of arrival computer device 112 uses a maximum likelihood criterion to select the most likely correct direction of arrival. The direction of arrival computer device 112 compares the estimated directions of arrival to the actually measured directions of arrival.

$$\hat{k} = \arg \max_k f_\psi(\psi_k \mid \eta_k) \quad \text{EQ. 7}$$

where $\hat{k}$ is the estimate of which candidate is the correct normalized phase, and $\hat{\eta}$ is equal to $\hat{\eta}_{\hat{k}}$. The calculated errors between different antenna pairs may be interconnected and/or related to each other. For example, if the error between the first antenna and the second antenna is large, then the error between the first antenna and the third antenna might also be large. However, this covariance is accounted for in Equations 3-7.

The direction of arrival computer device 112 may process received signals 104 based on their associated frequencies. For example, the non-uniform linear array 102 may receive signals 104 from two different sources on two different frequencies, simultaneously. The system 100 determines the direction of arrival for each frequency separately.

Figure 6:
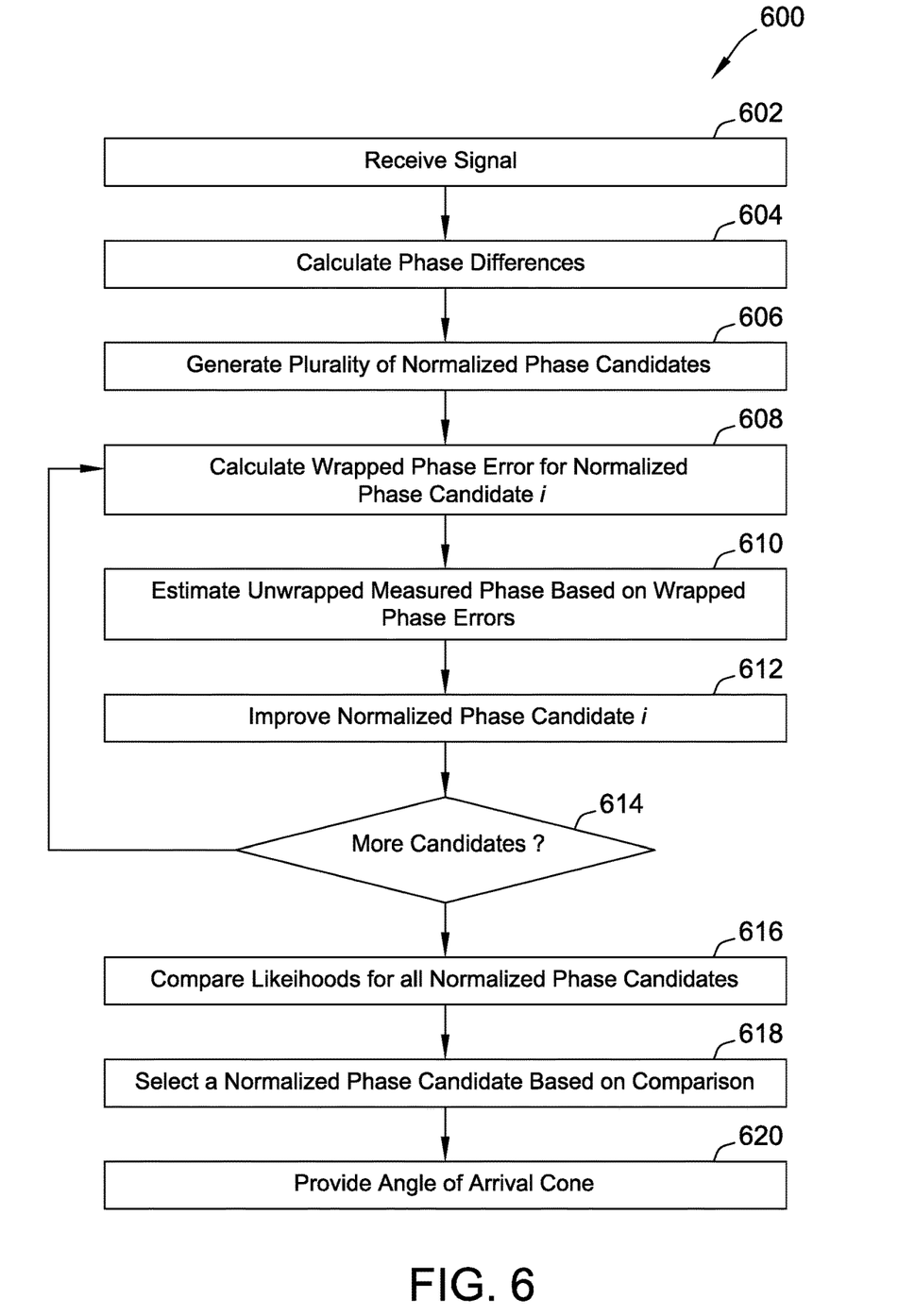
FIG. 6 illustrates an example process for processing the direction of arrival using the system shown in FIG. 1.

FIG. 6 illustrates an example process 600 for processing the direction of arrival using the system 100 (shown in FIG. 1). In the exemplary embodiment, process 600 is performed by the direction of arrival computer device 112 (shown in FIG. 1).

In the exemplary embodiment, the non-uniform linear array 102 (shown in FIG. 1) receives 602 a wireless signal 104 (shown in FIG. 1) from a source 502 (shown in FIG. 1). The non-uniform linear array 102 transmits the signals 104 received by each antenna 202 (shown in FIG. 2) of the non-uniform linear array 102 to the phase measurement unit 108 (shown in FIG. 1). The phase measurement unit 108 calculates 604 the phase differences 110 (shown in FIG. 1) between pairs of antennas 202. In the exemplary embodiment, if there M antenna 202 in the non-uniform linear array, then the phase measurement unit 108 generates M−1 phase differences 110 such that each antenna 202 is included in at least one phase difference 110. The phase differences 110 are transmitted to the direction of arrival computer device 112.

In the exemplary embodiment, the direction of arrival computer device 112 generates 606 a plurality of normalized phase candidates 404 from the plurality of phase differences 110. The direction of arrival computer device 112 uses the phase measurement unit's noisy measured phases $\phi$ to estimate the signal source's direction of arrival $\theta$ by estimating the normalized phase $\eta = \cos(\theta)$.

In the exemplary embodiment, the presumed measurement noise model is:

$$y = y_t(\eta) + n \qquad \text{EQ. 8}$$

where n is a multivariate random vector with means zero and the covariance matrix R, such that $n \sim N[0,R]$. Because antennas 202 (shown in FIG. 2) may appear in more than one phase pair, the covariance matrix R is not diagonal. The phase errors in y can fall outside of the interval $[0, 2\pi]$, but are then wrapped into this interval in the wrapped phase measurements $\phi$. The phase noise in $\phi$ thus obeys a wrapped normal distribution.

The goal of process 600 is to find the maximum likelihood normalized phase value $\hat{\eta}_{ML}$:

$$\hat{\eta}_{ML} = \arg \max_{\eta} f_\phi(\phi \mid H = \eta) \qquad \text{EQ. 9}$$

To efficiently calculate the maximum likelihood criterion, the direction of arrival computer device 112 uses an efficient estimation method in process 600. In the exemplary embodiment, the direction of arrival computer device 112 generates the normalized phase estimate $\hat{\eta}$ using process 600.

In the exemplary embodiment, the direction of arrival computer device 112 generates 606 a set of normalized phases candidates 404 using Equation 3. In this Step 606, the direction of arrival computer device 112 finds each of the K≥1 normalized phase candidate values. These are all the normalized phases, which, in the absence of noise, would have resulted in the phase measured between the widest spaced pair of antennas 202. The set of K candidate normalized phase values is computed using Equation 3, where:

$$k \in \left[ \left\lceil \frac{-d_{max}}{\lambda} \right\rceil, \left\lceil \frac{d_{max}}{\lambda} \right\rceil \right] \qquad \text{EQ. 10}$$

This set of candidates 404 includes every possible direction of arrival, using only the phase measured on the widest separated pair of antennas 202, and assuming there is no measurement noise in this phase. The number of normalized phase candidates 404, K, is normally greater than one because the signal wavelength will normally be shorter than $d_N$. In the exemplary embodiment, the non-uniform linear array 102 (shown in FIG. 1) is designed to yield a K between roughly one and twenty, to account for all signal wavelengths the system 100 (shown in FIG. 1) may receive. The result of Step 606 is that the direction of arrival computer device 112 has K possible normalized phase candidates 404. In the exemplary embodiment, the maximum likelihood answer is close to one of them.

In the exemplary embodiment, the direction of arrival computer device 112 performs steps 608 through 614 for each normalized phase candidate 404. The direction of arrival computer device 112 calculates 608 wrapped phase errors 406 (shown in FIG. 4) for each normalized phase candidate 404 using Equation 4. In Step 608, the direction of arrival computer device 112 rolls each measured phase into the interval $[-\pi, \pi]$ relative to the expected phases for each normalized phase candidate 404 ($\eta_k$). This is done in preparation for improving 612 the normalized phase candidates 404 using data from the other antenna pairs. This results in a vector of phase measurements $\psi_k$, which is specific to each candidate 404 ($\eta_k$). The effect is that the unrolled measured phases estimates will be the ones closest to the normalized phase candidates 404, rather than possibly being $\pm 2\pi$ away.

In the exemplary embodiment, for each normalized phase candidate 404, the direction of arrival computer device 112 estimates 610 the unwrapped measured phases using Equation 5. The direction of arrival computer device 112 calculates estimates $\hat{y}_k$ of the unrolled "measured" phases y. These are estimated since it is not physically possible for the phase measurement unit 108 (shown in FIG. 1) to directly measure the unrolled phases y. Each estimate $\hat{y}_k$ is a vector and depends on its normalized phase candidate 404 ($\eta_k$). Each estimate $\hat{y}_k$ answers the question, "if it were possible to measure the unwrapped phases $y_t$, what would they be if the true normalized phase $\eta_t$ were close to $\eta_K$."

In the exemplary embodiment, the direction of arrival computer device 112 improves 612 each normalized phase candidate 404 using Equation 6. The direction of arrival computer device 112 calculates 612 the approximate maximum likelihood normalized phase for each normalized phase candidate 404 ($\eta_k$), using the unwrapped phases estimated in Step 610. This is the first step where the direction of arrival computer device 112 uses the measurements of other phases in $\phi$ besides just $\phi_{max}$. The probability density function for the unwrapped phase measurements is:

$$f_y(y \mid \eta) = \frac{1}{\sqrt{4\pi|R|}} \exp\left( \left( y - \frac{d}{\lambda}\eta \right)^T R^{-1} \left( y - \frac{d}{\lambda}\eta \right) \right) \qquad \text{EQ. 11}$$

As a multivariate normal distribution, this distribution has a single maximum value, which occurs where the derivative of the exponent with respect to normalized phase U is zero. Solving for this yields the estimator:

$$\hat{\eta}_k = \lambda \frac{\hat{y}_k^T R d}{d^T R d} \qquad \text{EQ. 12}$$

Which may be more efficiently computed as:

$$\hat{\eta}_k = \lambda \hat{y}_k^T b \qquad \text{EQ. 13}$$

where $$b = \frac{R d}{d^T R d} \qquad \text{EQ. 14}$$

In the exemplary embodiment, the direction of arrival computer device 112 precomputes b since it results from the design of the non-uniform linear array 102 and phase measurement unit 108. Accordingly, b does not change for signals 104 received from sources 502 at different positions.

The result of Step 612 is a refinement of the original normalized phases candidates 404 ($\eta_k$) from Step 606. Each estimate is the maximum likelihood estimate, assuming its candidate 404 ($\eta_k$) was close to the true normalized phase 402 ($\eta$) for the signal 104. The direction of arrival computer device 112 determines 614 if there are more normalized phase candidates 404 to analyze. If there are, then the direction of arrival computer device 112 returns to Step 608 for the next normalized phase candidate 404. Otherwise, the direction of arrival computer device 112 continues to Step 616.

In the exemplary embodiment, the direction of arrival computer device 112 compares 616 the likelihoods from all of the normalized phase candidates 404. Based on the comparison, the direction of arrival computer device 112 selects 618 the most likely normalized phase candidate 404 from the set of improved candidates 404 as the direction of arrival estimate $\hat{\eta}$ 114, using Equation 7. In Step 618, the direction of arrival computer device 112 finds the estimate normalized phase 404 ($\hat{\eta}_k$) from Step 612 with the highest likelihood score considering the rolled phases $\phi$ that were actually measured. The conditional probability density function for the wrapped measured phases $\psi$ is:

$$f_\psi(\psi|\eta) = \sum_{a_1=-\infty}^{\infty} \cdots \sum_{a_N=-\infty}^{\infty} f_n(\psi + 2\pi a) \qquad \text{EQ. 15}$$

where $$a = \begin{pmatrix} a_1 \\ \vdots \\ a_N \end{pmatrix} \qquad \text{EQ. 16}$$

This probability density function is conditional because $\psi$ is being evaluated based on an assumption for $\eta$. The conditional probability density function is based on the direction of arrival computer device's 112 noise model, which models unwrapped phase measurement errors as a multivariate normal distribution with zero mean and known covariance matrix R. The phase noise probability density function according to the direction of arrival computer device's 112 model is therefore:

$$f_n(n) = \frac{1}{\sqrt{4\pi|R|}} \exp(-n^T R n) \qquad \text{EQ. 17}$$

Exact evaluation of $(\psi|\eta)$ requires an infinite summation, which is not possible to compute exactly. The direction of arrival computer device 112 thus evaluates $(\psi|\eta)$ by limiting the indices of summation to $|a_i| \leq A$. Any potential errors for A=1 or even A=0 are limited by Equation 4 and Step 608, which first centers errors 406 on the likely answer. To further reduce computational time, the direction of arrival computer device 112 may use A=0. In addition, to further simplify the computations the direction of arrival computer device 112 may use the negative log likelihood function:

$$L(\eta) = -\psi^T R \psi \qquad \text{EQ. 18}$$

And then seeking the maximum of:

$$\hat{k} = \arg\max_k L(\hat{\eta}_k) \qquad \text{EQ. 19}$$

The direction of arrival computer device 112 makes this maximization by evaluating each ($\hat{\eta}_k$) and keeping whichever is most likely where $\hat{\eta}$ is equal to $\hat{\eta}_k$.

Accordingly, the system 100 disclosed herein accounts for the covariance between phase measurements made on antenna pairs sharing an antenna 202, instead of assuming the measured phase differences 110 are independent. The system 100 also approximates a maximum likelihood solution, instead of relying on a non-statistical criterion for best guess. The system 100 further wraps the phase errors to [−π,π], relative to a nominal phase candidate neighborhood, reducing the number of terms needed to evaluate the wrapped phase measurement's probability density function. The system 100 performs 612 likelihood function evaluations using as many terms in the wrapped phase probability density function as are computationally feasible. The system 100 further performs the estimations in normalized phase space, making the local maximum likelihood estimates linear and mostly pre-computable. In the exemplary embodiment, the direction of arrival computer device 112 uses the angle 506 (shown in FIG. 5) from the direction of arrival estimate 114 to provide 620 the cone 508 of potential angles of arrival for the wireless signal 104.

Figure 7:
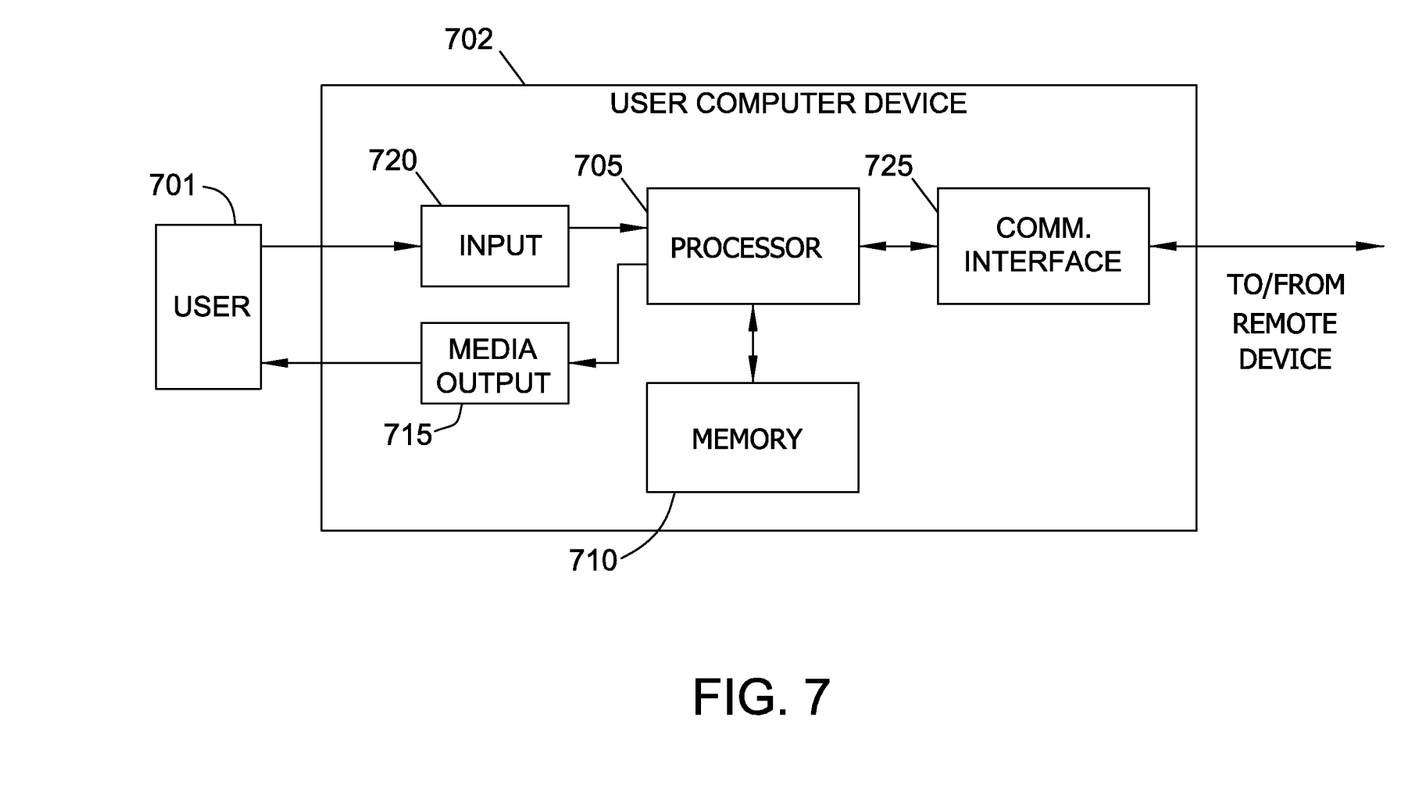
FIG. 7 illustrates an example configuration of a client computer device shown in FIG. 1, in accordance with one embodiment of the present disclosure.

FIG. 7 illustrates an example configuration of client system, in accordance with one embodiment of the present disclosure. User computer device 702 is operated by a user 701. User computer device 702 may include, but is not limited to, direction of arrival computer device 112 (shown in FIG. 1). User computer device 702 includes a processor 705 for executing instructions. In some embodiments, executable instructions are stored in a memory area 710. Processor 705 may include one or more processing units (e.g., in a multi-core configuration). Memory area 710 is any device allowing information such as executable instructions and/or transaction data to be stored and retrieved. Memory area 710 may include one or more computer-readable media.

User computer device 702 also includes at least one media output component 715 for presenting information to user 701. Media output component 715 is any component capable of conveying information to user 701. In some embodiments, media output component 715 includes an output adapter (not shown) such as a video adapter and/or an audio adapter. An output adapter is operatively coupled to processor 705 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 715 is configured to present a graphical user interface (e.g., a web browser and/or a client application) to user 701. A graphical user interface may include, for example, an interface for viewing the results of the analysis of one or more subject systems. In some embodiments, user computer device 702 includes an input device 720 for receiving input from user 701. User 701 may use input device 720 to, without limitation, select a data source to view the analysis of Input device 720 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 715 and input device 720.

User computer device 702 may also include a communication interface 725, communicatively coupled to a remote device such as a phase measurement unit 108 (shown in FIG. 1) or a direction of arrival computer device 112. Communication interface 725 may include, for example, a wired or wireless network adapter and/or a wireless data transceiver for use with a mobile telecommunications network.

Stored in memory area 710 are, for example, computer-readable instructions for providing a user interface to user 701 via media output component 715 and, optionally, receiving and processing input from input device 720. A user interface may include, among other possibilities, a web browser and/or a client application. Web browsers enable users, such as user 701, to display and interact with media and other information typically embedded on a web page or a website from direction of arrival computer device 112. A client application allows user 701 to interact with, for example, direction of arrival computer device 112. For example, instructions may be stored by a cloud service, and the output of the execution of the instructions sent to the media output component 715.

Processor 705 executes computer-executable instructions for implementing aspects of the disclosure. In some embodiments, the processor 705 is transformed into a special purpose microprocessor by executing computer-executable instructions or by otherwise being programmed.

The methods and system described herein may be implemented using computer programming or engineering techniques including computer software, firmware, hardware, or any combination or subset. As disclosed above, at least one technical problem with prior systems is that there is a need for systems for a cost-effective and reliable manner for determining a direction of arrival of a wireless signal. The system and methods described herein address that technical problem. Additionally, at least one of the technical solutions to the technical problems provided by this system may include: (i) improved speed in processing direction of arrival calculations, (ii) improved accuracy in direction of arrival calculations; (iii) correctly accounting for covariance between phase measurements, thus improving accuracy; (iv) approximating the maximum likelihood solution instead of relying on non-statistical methods, thus improving accuracy; (v) wrapping phase measurements to high-likelihood branches, improving computational speed and accuracy; (vi) providing scalable evaluation of likelihood function to one or more branches as need, thus improving computational speed and accuracy; and (vii) performing estimation in normalized phase space, improving computational speed.

The methods and systems described herein may be implemented using computer programming or engineering techniques including computer software, firmware, hardware, or any combination or subset thereof, wherein the technical effects may be achieved by performing at least one of the following steps: a) receive a plurality of normalized phase candidates for the direction of arrival of a received wireless signal, wherein the received wireless signal is received by a non-uniform linear array comprising a plurality of antenna; b) for each of the plurality of normalized phase candidates, calculate a phase error; c) for each of the plurality of normalized phase candidates, estimate a measured phase based on the corresponding phase error; d) for each of the plurality of normalized phase candidates, calculate a likelihood normalized phase based on the corresponding measured phase; e) select a normalized phase candidate as a direction of arrival estimate based on a comparison of the plurality of likelihood normalized phases; f) receive the wireless signal from each of the plurality of antenna of the non-uniform linear array; g) calculate the plurality of phase shifts between the wireless signal at pairs of the plurality of antenna; h) transmit the plurality of phase shifts to the computing device; i) generate the plurality of normalized phase candidates based on the plurality of phase shifts; j) generate a number of phase shifts equal to one less than a number of the plurality of antenna in the non-uniform linear array, and wherein each antenna in the plurality of antenna is included in at least one phase shift of the plurality of phase shifts; k) generate the plurality of normalized phase candidates based on at least one phase shift of the plurality of phase shifts, a distance between two antennas in the non-uniform linear array associated with the at least one phase shift, and a frequency of the wireless signal; l) generate a set of normalized phase candidates for each phase shift; m) compare the phase errors associated with each set of normalized phase candidates; n) receive a first signal from a first source and a second signal from a second source; o) determine a first direction of arrival for the first signal and a second direction of arrival for the second signal; and p) transmit the direction of arrival to a client computer device.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for determining a direction of arrival for signals, the system comprising:
   a non-uniform linear array comprising a plurality of antenna and configured to receive a wireless signal; and
   a computing device comprising at least one processor in communication with at least one memory device, wherein said at least one processor is programmed to:

receive a plurality of normalized phase candidates for the direction of arrival of the received wireless signal;

for each of the plurality of normalized phase candidates, calculate a phase error;

for each of the plurality of normalized phase candidates, estimate a corresponding unwrapped measured phase based on the corresponding phase error;

for each of the plurality of normalized phase candidates, calculate a maximized likelihood normalized phase based on the corresponding plurality of unwrapped measured phases; and select a normalized phase candidate as a direction of arrival estimate based on a comparison of the plurality of maximized likelihood normalized phases.

2. The system in accordance with claim 1, further comprising a phase measurement unit in communication with said non-uniform linear array and said computing device, wherein said phase measurement unit is configured to:

receive the wireless signal from each of the plurality of antenna of said non-uniform linear array;

calculate a plurality of phase shifts between the wireless signal at pairs of the plurality of antenna; and transmit the plurality of phase shifts to said computing device.

3. The system in accordance with claim 2, wherein said at least one processor is further programmed to generate the plurality of normalized phase candidates based on the plurality of phase shifts.

4. The system in accordance with claim 2, wherein said phase measurement unit generates a number of phase shifts equal to one less than a number of the plurality of antenna in the non-uniform linear array, and wherein each antenna in the plurality of antenna is included in at least one phase shift of the plurality of phase shifts.

5. The system in accordance with claim 2, wherein said at least one processor is further programmed to generate the plurality of normalized phase candidates based on at least one phase shift of the plurality of phase shifts, a distance between two antennas in said non-uniform linear array associated with the at least one phase shift, and a frequency of the wireless signal.

6. The system in accordance with claim 5, wherein said at least one processor is further programmed to:

generate a set of normalized phase candidates for each phase shift; and compare the phase errors associated with each set of normalized phase candidates.

7. The system in accordance with claim 1, wherein said non-uniform linear array receives a first signal from a first source and a second signal from a second source, and wherein said at least one processor is further programmed to determine a first direction of arrival for the first signal and a second direction of arrival for the second signal.

8. The system in accordance with claim 1, wherein said at least one processor is further programmed to transmit the direction of arrival to a client computer device.

9. The system in accordance with claim 1, wherein the normalized phase candidate represents the angle between the direction of arrival estimate and an array vector of said non-uniform linear array.

10. A computing device for determining a direction of arrival for signals, the computing device comprising at least one processor in communication with at least one memory device, wherein said at least one processor is programmed to:

receive a plurality of normalized phase candidates for the direction of arrival of a received wireless signal, wherein the received wireless signal is received by a non-uniform linear array comprising a plurality of antenna;

for each of the plurality of normalized phase candidates, calculate a phase error;

for each of the plurality of normalized phase candidates, estimate a corresponding unwrapped measured phase based on the corresponding phase error;

for each of the plurality of normalized phase candidates, calculate a maximized likelihood normalized phase based on the corresponding plurality of unwrapped measured phases; and select a normalized phase candidate as a direction of arrival estimate based on a comparison of the plurality of maximizes likelihood normalized phases.

11. The computing device in accordance with claim 10, where said at least one processor is further programmed to receive a plurality of phase shifts from a phase measurement unit, wherein the phase measurement unit is in communication with the non-uniform linear array and is configured to:

receive the wireless signal from each of the plurality of antenna of the non-uniform linear array;

calculate the plurality of phase shifts between the wireless signal at pairs of the plurality of antenna; and transmit the plurality of phase shifts to the computing device.

12. The computing device in accordance with claim 11, wherein said at least one processor is further programmed to generate the plurality of normalized phase candidates based on the plurality of phase shifts.

13. The computing device in accordance with claim 11, wherein the phase measurement unit is also configured to generate a number of phase shifts equal to one less than a number of the plurality of antenna in the non-uniform linear array, and wherein each antenna in the plurality of antenna is included in at least one phase shift of the plurality of phase shifts.

14. The computing device in accordance with claim 11, wherein said at least one processor is further programmed to generate the plurality of normalized phase candidates based on at least one phase shift of the plurality of phase shifts, a distance between two antennas in the non-uniform linear array associated with the at least one phase shift, and a frequency of the wireless signal.

15. The computing device in accordance with claim 14, wherein said at least one processor is further programmed to:

generate a set of normalized phase candidates for each phase shift; and compare the phase errors associated with each set of normalized phase candidates.

16. The computing device in accordance with claim 10, wherein the non-uniform linear array receives a first signal from a first source and a second signal from a second source, and wherein said at least one processor is further programmed to determine a first direction of arrival for the first signal and a second direction of arrival for the second signal.

17. The computing device in accordance with claim 10, wherein said at least one processor is further programmed to transmit the direction of arrival to a client computer device.

18. The computing device in accordance with claim 10, wherein the normalized phase candidate represents the angle between the direction of arrival estimate and an array vector of said non-uniform linear array.

19. A method for determining a direction of arrival for signals, the method implemented on a computing device including at least one processor in communication with at least one memory device, the method comprising:

receiving a plurality of normalized phase candidates for the direction of arrival of a received wireless signal, wherein the received wireless signal is received by a non-uniform linear array comprising a plurality of antenna;

for each of the plurality of normalized phase candidates, calculating a phase error;

for each of the plurality of normalized phase candidates, estimating a corresponding unwrapped measured phase based on the corresponding phase error;

for each of the plurality of normalized phase candidates, calculating a maximized likelihood normalized phase based on the corresponding plurality of unwrapped measured phases; and     selecting a normalized phase candidate as a direction of arrival estimate based on a comparison of the plurality of maximized likelihood normalized phases.

20. The method in accordance with claim 19 further comprising:

receiving a plurality of phase shifts from a phase measurement unit, wherein the phase measurement unit received the wireless signal from each of the plurality of antenna of the non-uniform linear array and calculated the plurality of phase shifts between the wireless signal at pairs of the plurality of antenna; and     generating the plurality of normalized phase candidates based on at least one phase shift of the plurality of phase shifts, a distance between two antennas in the non-uniform linear array associated with the at least one phase shift, and a frequency of the wireless signal.

\* \* \* \* \*